(No Model.)
2 Sheets—Sheet 1.
J. H. RING.
MACHINE FOR MAKING CARTRIDGE SHELLS.
No. 311,035. Patented Jan. 20, 1885.
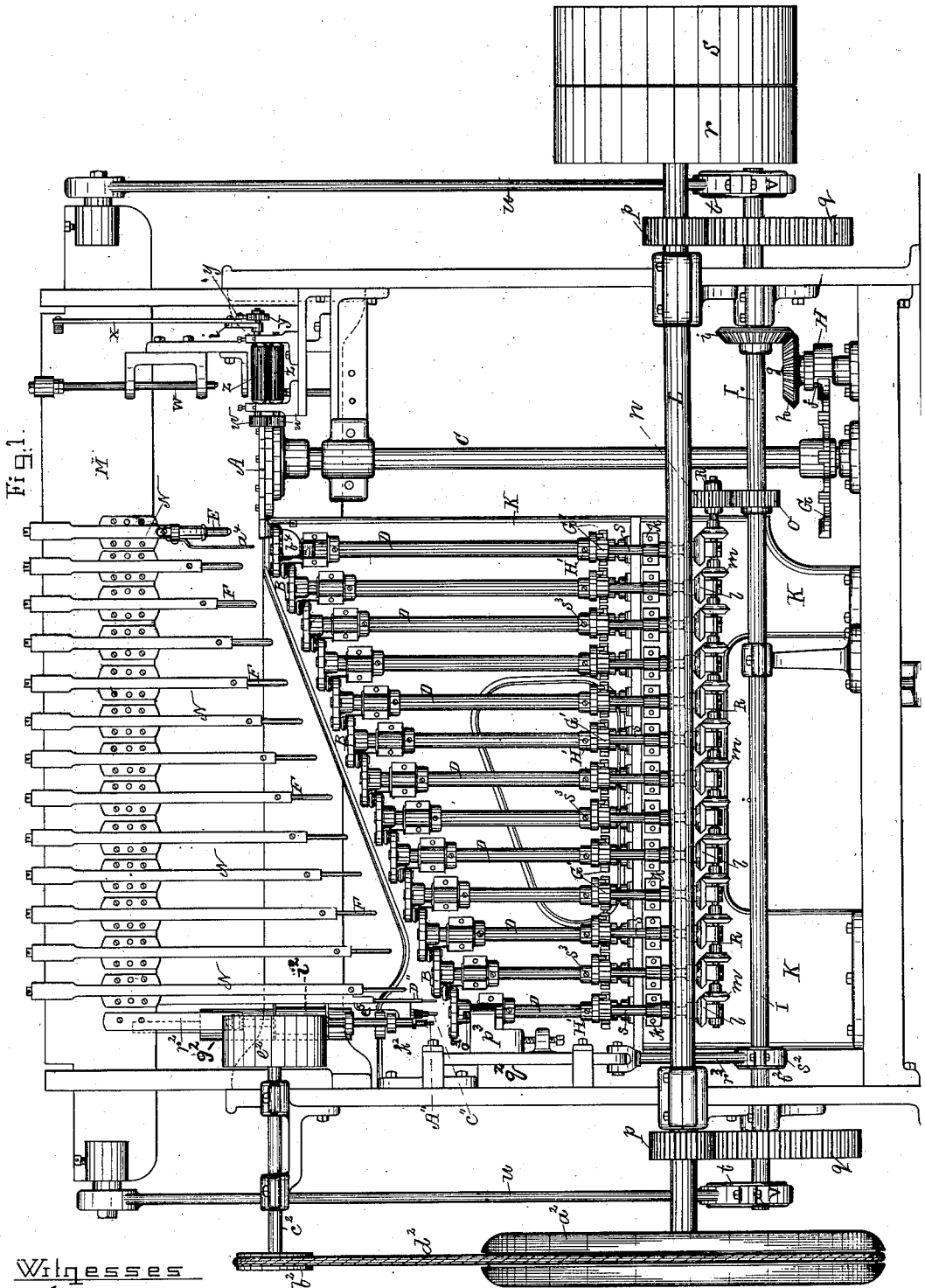
Witnesses
S. N. Piper
E. B. Pratt
Inventor
John Henry Ring
by R. H. Eddy atty.

(No Model.) 2 Sheets—Sheet 2.
J. H. RING.
MACHINE FOR MAKING CARTRIDGE SHELLS.
No. 311,035. Patented Jan. 20, 1885.
Fig. 3. Fig. 4.
Fig. 2.
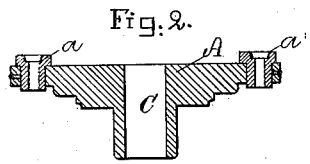
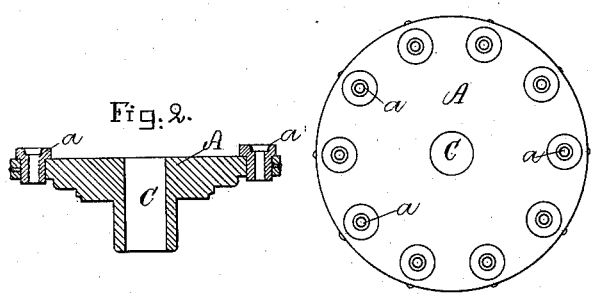
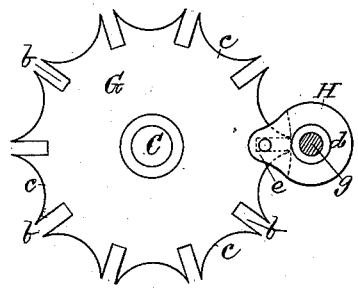
Fig. 6. Fig. 5.
Fig. 7.
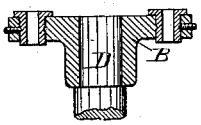
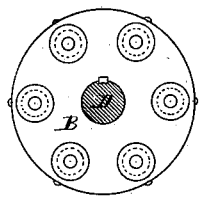
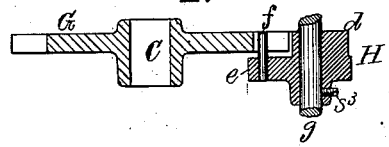
Fig. 8. Fig. 9. Fig. 10. Fig. 11.
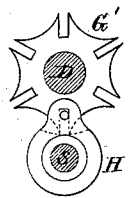
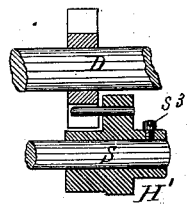
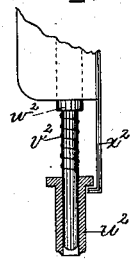
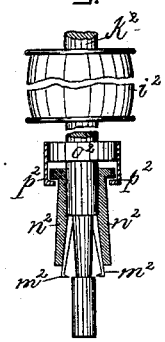
Fig. 13.
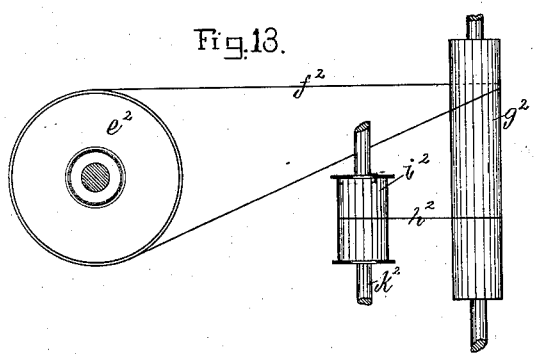
Fig. 12.
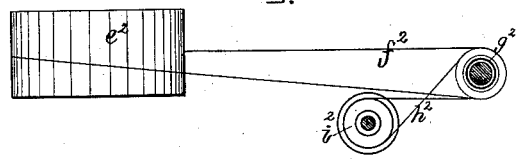
Witnesses. Fig. 14. Fig. 15. Inventor
S. N. Piper  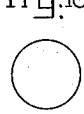 John Henry Ring.
E. B. Pratt by R. H. Eddy atty.

UNITED STATES PATENT OFFICE.

JOHN HENRY RING, OF LOWELL, MASSACHUSETTS, ASSIGNOR TO THE AMERICAN AUTOMATIC CARTRIDGE COMPANY, OF SAME PLACE.

MACHINE FOR MAKING CARTRIDGE-SHELLS.

SPECIFICATION forming part of Letters Patent No. 311,035, dated January 20, 1885.

Application filed February 25, 1884. (No model.)

*To all whom it may concern:*

Be it known that I, JOHN HENRY RING, of Lowell, in the county of Middlesex, of the Commonwealth of Massachusetts, have invented a new and useful Improvement in Machinery for Making Metallic Shells for Cartridges of Fire-Arms or other Purposes; and I do hereby declare the same to be described in the following specification and represented in the accompanying drawings, of which—

Figure 1 is a front elevation of a machine embodying my invention, the nature of which is defined in the claims hereinafter presented. Fig. 2 is a transverse section, and Fig. 3 a top view of the main or first rotary disk-carrier. Fig. 4 is a top view, and Fig. 5 is a transverse section, of the radially-notched wheel and the actuator for intermittently revolving the shaft of the said disk-carrier. Fig. 6 is a top view, and Fig. 7 a transverse section, of one of the auxiliary rotary disk-carriers. Fig. 8 is a top view, and Fig. 9 a transverse section, of one of the radially-notched wheels and its actuator for intermittently revolving the shaft of each auxiliary disk-carrier. Fig. 10 is a view of the pinch V, to be described. Fig. 11 is a sectional view of the trimmer, hereinafter explained. Fig. 12 is a top view, and Fig. 13, a side view, of certain belts and pulleys, constituting part of the machine.

The said machine automatically and rapidly makes from sheet metal cartridge-shells, each having the form as represented in longitudinal section in Fig. 14 and in end view in Fig. 15.

In the said machine there are, besides a primary rotary die-carrier, A, and a series of auxiliary rotary die-carriers, B, revolved on separate vertical shafts C and D D, &c., and arranged with each other and the said shaft, as represented in Fig. 1, a mechanism for feeding the strip of metal to the primary die-carrier. Furthermore, there is a series of punches, E and F, for the said die-carriers, such punches being provided with mechanism for intermittently reciprocating them vertically. There is also mechanism for trimming each shell to its proper length, and mechanism for heading the shell. Each die-carrier is a circular wheel or disk provided with a series of dies arranged in it in circle at equal distances apart, and extending through it, such being as shown in Figs. 2 and 3, and 6 and 7, in which *a* are the dies, those of each carrier having their bases a little less in diameter than those of the dies of the next preceding carrier. Each carrier laps on that next succeeding and below it, and they have to their shafts mechanisms for intermittently revolving them, so as throughout the series to carry a die of one carrier directly over that of the next succeeding one, in order that a punch in passing through the upper of the said dies may enter the lower one and force a shell from the upper into the lower of the two.

I have found by experience that when each of the shafts of the die-carriers is provided with a gear and such gears are arranged in a train to engage with one another, in order that when the gear of the first shaft is put in revolution all the other shafts will be simultaneously revolved, there is little if any certainty of the dies being brought into their proper relations for the reception of the several punches, and therefore I do not use in the machine such a series of gears, but have adopted other devices, parts of which can be readily adjusted to render the dies of the die-carriers certain to come into their proper relations preparatory to the reception of the punches. For this purpose we have to operate each die-carrier shaft, a radially-notched wheel and its actuator. The radially-notched wheel for the shaft C is shown at G in Figs. 1, 4, and 5, and its actuator at H in the said figures. Each wheel G has ten radial notches, *b*, arranged in it peripherally, as shown, and at equal distances apart, and between each two notches the wheel-periphery is notched to the arc of a circle whose diameter corresponds to that of a circular segment, *d*, constituting a part of the actuator and arranged, as shown, on a level with the notched wheel G. Besides this segment the actuator is provided with an arm, *e*, to extend under the wheel G, and to carry a pin or stud, *f*, to extend upward into one of the radial slots *b* of the wheel. The actuator is fixed on a short shaft, *g*, which is separate from and parallel with the shaft C, and is provided with a bevel-gear, *h*, to engage with a bevel-gear, *i*, arranged on a horizontal shaft, I, as shown in Fig. 1. The actuator, during each revolution of it, will, by means of the pin $f$ and notch $b$, partially revolve the wheel G, and next will hold it in position while the segment of the actuator may be turning in a notch, $c$.

To each shaft D there is such a notched wheel, which is shown in Fig. 8 at G', it having six radial notches and a like number of intermediate curved notches to operate with its actuator H'. The series of actuators H' are carried by a series of short vertical shafts, S, arranged as shown in Figs. 1, 8, and 9, and properly sustained in boxes $k$, suitably supported by the frame K of the machine. Each of the said shafts S has fixed on it, near its lower end, a bevel-gear, $l$, to engage with another such gear, $m$. The series of gears $m$ is supported by a shaft, R, provided with a spur-gear, $n$, that engages with a spur-gear, $o$, fixed on the shaft I. Each actuator H' has on its hub one or more screws, $s^3$, (see Figs. 1 and 9,) for clamping it to its supporting-shaft. These screws admit of the actuator being properly adjusted to their notched wheels as occasion may require, to keep the dies of the die-carriers in their due relations.

Above the shaft I is the driving-shaft L, that engages with the said shaft I by means of four gears, $p\,p\,q\,q$, arranged as represented. At or near one end of it the shaft L is provided with a fast pulley, $r$, and a loose pulley, $s$, about the former of which a belt from a suitable motor is to run in order to cause the shaft to revolve. Excentrics $t$ on the shaft I connect with a bar, M, by means of their collars $v$ and connecting-rods $u$, such bar being suitably guided so as to be capable of moving vertically. To the bar the several punch-carriers N are fastened, and are arranged as represented in Fig. 1.

The feed-rollers are shown at Z Z, they having on their shafts connecting-gears $w\,w$, as represented. On the shaft of the upper of such rollers there is fixed a ratchet-wheel, Y, to be operated by a pawl, $y$, jointed to a crank, $i$, that is joined to the bar M by a connecting-rod, X. During each descent of the said bar the feed-rollers will be put in operation so as to advance the strip of metal to the main die-carrier A. All of the punches will at the same time be forced down through their die-carriers in a manner to cause such cartridge-shell blank operated on by such punches to be forced from one die-carrier down into that next below it, the blank being elongated and reduced in the meantime by the punch and lower die. In this way the blank becomes in the operation of the machine moved from one die-carrier to the next one in the series, until it may reach the die that may carry it immediately beneath the trimmer A'', a detailed view of such trimmer being given in Fig. 11. Having arrived at such a position the blank or shell will have been reduced diametrically to the proper size for being trimmed to the proper length for being headed and expelled from the machine. A coil or strip of copper plate of the required width being duly supported, and introduced endwise between the feed-rollers, will be by them introduced under the punch W over the main die-carrier. This punch next descending, will, with the die under it, separate from the strip a blank as a disk or circular plate of the metal, which will be forced into the die. The carrier A has ten of such dies, which in course of each revolution of it will be successively supplied with such blanks. Each of the auxiliary die-carriers has six dies. By means of their operative notched wheels and their actuators, as described, the several die-carriers will be intermittently revolved, the punches acting while the die-carriers may be at rest. During each descent of the punches each auxiliary die-plate receives a blank and has one expelled from it.

To each auxiliary die-carrier I usually have means of stripping from the punch a shell or blank during a rise of the punch out of a die of such carrier, and for such purpose elastic jaws or springs may be used to extend between each two die-carriers, such springs being adapted to admit of the punch and blank, in the passage of the latter from one die into another, to pass between such springs, they so closing upon the punch after the blank may have been forced into the lower of the two dies as to come directly over the upper end of the blank and prevent it from being drawn upward out of the die by the punch while rising. When the first of the blanks reach the extractor, or to a position to be expelled by it from the last of the series of auxiliary die-carriers, the dies of such carriers will have become fully charged with the blanks, in order for a perfect shell to be expelled from the machine during each interval of rest of the die-carriers. The number expelled per minute may be very large, as one hundred or thereabout, if the machine be suitably constructed.

On the shaft L there is fixed at one end of it a peripherally-grooved balance-wheel, $a^2$, about which and a pulley, $b^2$, on a shaft, $c^2$, arranged as shown, an endless band, $d^2$, passes. A drum, $e^2$, fixed on the shaft $c^2$, has an endless band, $f^2$, (see Figs. 12 and 13,) going about it, and a vertical drum, $g^2$, about which and another such drum, $i^2$, an endless crossed band, $h^2$, works. The said drum $i^2$ is carried by the spindle $K^2$ of the trimmer $m^2$. This trimmer consists of two springs, arranged as shown in Fig. 11, and having at their lower ends cutters, which, when the said springs attached to the spindle $k^2$ are forced in toward it by a sleeve, $n^2$, encompassing the springs and spindle, close upon the blank or shell and cut or trim it to the right length. The sleeve slides on the spindle, and is depressed thereon by a shoulder or flange, $o^2$, of the spindle in course of the descent of the latter into the blank. Hooks $p^2$, extending from the flange or shoulder, and hooking under a flange at the upper end of the sleeve, serve to draw the sleeve upward on the spindle being raised. The spindle $K^2$ has its supporting devices or bearings projecting from an arm or bar, $r^2$, fixed on the bar M, (see Fig. 1,) the said spindle being moved vertically by the said bar $r^2$ when the latter is so moved by the bar M.

Directly over the last auxiliary die-carrier is a punch, C″, for holding the shell in position in a die, while the header $o^3$ performs its duty of heading the shell or upsetting it at its lower end. This punch C″ and the shell-expeller D″ are projected from a bar or supporter, $e^5$, extending down from the bar M. After a shell may have been headed it will be moved around under the expeller D″, which, on descending with the punches, will force the shell out of the die in which it may have been headed.

The header $o^3$ is arranged as shown in Fig. 1, projecting from an adjustable support-piece, $p^3$, fixed to a vertical slider, $q^2$, jointed to the connecting-rod $r^3$ of the cutter $s^2$ of an eccentric, $t^2$, fixed on the shaft I. By such means the header receives its proper reciprocating vertical motions when the said shaft is in revolution.

The punch E, hereinbefore mentioned, is the cupping-punch, its duty, with a die of the main die-carrier, being to impart to the circular disk the shape of a cylindrical cup. On the punch shown in Fig. 10 is a movable flanged sleeve, $u^2$, resting on the upper end of which and encompassing the punch is a spiral spring, $v^2$, bearing against a shoulder, $w^2$, of the punch. From the bar N, carrying the punch, a hook, $x^2$, projects and extends under the flange of the sleeve $u^2$, as shown in Fig. 10. In a descent of the punch the sleeve will be forced down upon the blank by the spring $v^2$, and with the die will hold it, so as to enable the punch to properly act with the die in reducing the blank to the cup shape, as mentioned.

There projects down from the carrying-bar N of the cupping-punch a piece of wire or a metallic strip, $a^4$, which wire, during a descent of the bar, is to pass through one of the dies into a cup, $b^4$, suitably arranged and containing oil for oiling the dies, the oil being by the shells carried from one die to another. Such means are sufficient for lubricating the entire series of dies of the die-carriers.

In the operation of the machine, the strip, whether it be of copper or other proper metal or material, is intermittently fed forward by the feed-rollers, and while the die-carriers may be at rest there is punched from the strip a blank, which, by the first punch, W, is driven into a die of the main carrier. During the revolution of the said carrier the blanks are successively carried around underneath the cupping-punch and over the die of the first of the auxiliary die-carriers. The blanks are successively driven by the punches from one die-carrier into the next one throughout the series, each blank in passing from one die into another being elongated by the latter. This having been done, each blank as it comes underneath the trimmer, will be trimmed by it to the proper length, and will next be headed by the header, and finally will be forced out of the last die-carrier by the expeller.

The expression "die-carriers" herein used is to be understood as meaning carriers not only for the dies but for the shells. Furthermore, the dies and punch of each carrier is to have a diameter somewhat less than that of those of the carrier next preceding.

I am aware of Patent No. 286,937, and the present invention is an improvement thereon. Such patented device has its die-carrier shafts operated one by another in a series, and the main die-carrier shaft by an actuator between it and the driving-shaft.

In the present invention the die-carrier shafts are independent of one another, and are operated by a counter-shaft by means of intervening actuators, each die-carrier shaft having its own actuator.

I claim—

1. In a cartridge-machine, the main die-carrier A, its shaft C, notched wheel G, and actuator H, in combination with the auxiliary die-carriers B, their shafts D, and notched wheels G, the shafts S, and actuators H′, and the shafts R and I, all constructed and arranged as set forth, whereby the die-carriers are operated in unison but independently of one another.

2. The combination of the lubricating strip or wire $a^4$ and oil-holder $b^4$, the feeding-rollers, the punches, and expeller, having mechanism for operating them, essentially as described, with the series of main and auxiliary die-carriers, and their dies and shafts, and with a notched wheel and its actuator, as described, applied to each other and each of the said shafts, and provided with mechanism for revolving such actuator, all being substantially and to operate as specified.

JOHN HENRY RING.

Witnesses:
R. H. EDDY,
E. B. PRATT.